(12) United States Patent
Stockschlaeder et al.

(10) Patent No.: US 10,011,021 B2
(45) Date of Patent: Jul. 3, 2018

(54) GRIPPING JAW SAFETY DEVICE WITH TONGUE AND GROOVE FOR HRC

(71) Applicant: KUKA Systems GmbH, Augsburg (DE)

(72) Inventors: Julian Stockschlaeder, Augsburg (DE); Zafer Bozada, Landsberg (DE); Tuncay Maris, Augsburg (DE)

(73) Assignee: KUKA Systems GmbH, Augsburg (DE)

( * ) Notice: Subject to any disclaimer, the term of this patent is extended or adjusted under 35 U.S.C. 154(b) by 0 days.

(21) Appl. No.: 15/315,199

(22) PCT Filed: Jun. 1, 2015

(86) PCT No.: PCT/EP2015/062132
§ 371 (c)(1),
(2) Date: Nov. 30, 2016

(87) PCT Pub. No.: WO2015/185496
PCT Pub. Date: Dec. 10, 2015

(65) Prior Publication Data
US 2017/0197317 A1 Jul. 13, 2017

(30) Foreign Application Priority Data
Jun. 2, 2014 (DE) .................... 10 2014 210 331

(51) Int. Cl.
*B25J 15/02* (2006.01)
*B25J 19/06* (2006.01)
*B25J 15/00* (2006.01)

(52) U.S. Cl.
CPC .......... *B25J 15/0047* (2013.01); *B25J 15/02* (2013.01); *B25J 15/0253* (2013.01); *B25J 19/06* (2013.01)

(58) Field of Classification Search
CPC .... B25J 15/0047; B25J 15/0095; B25J 15/02; B25J 15/0253; B25J 15/0293; B25J 15/083; B25J 15/086; B25J 19/06; Y10S 901/49
(Continued)

(56) References Cited

U.S. PATENT DOCUMENTS 3,386,726 A * 6/1968 Lorenz ...................... B23B 5/12
269/218
3,972,104 A * 8/1976 Partin ..................... B25B 27/02
29/280

(Continued)

FOREIGN PATENT DOCUMENTS

CN 201289310 Y 8/2009
DE 102011119784 A1 6/2013
(Continued)

OTHER PUBLICATIONS

European Patent Office; Search Report and Written Opinion in International Patent Application No. PCT/EP2015/062132 dated Sep. 18, 2015; 10 Pages.

(Continued)

*Primary Examiner* — Dean J Kramer
(74) *Attorney, Agent, or Firm* — Wood Herron & Evans LLP

(57) ABSTRACT

A gripping device, which is provided, in particular, as an effector for an industrial robot comprises first and second clamping jaws, which are arranged so as to be moveable relative towards each other in order to grasp a workpiece. The first clamping jaw is provided with a tongue projection and the second clamping jaw with a corresponding groove, which at least partially accommodates the tongue projection in the state in which the clamping jaws are moved towards each other in order to prevent objects or body parts from
(Continued)

being inadvertently inserted into the space between the clamping jaws.

19 Claims, 3 Drawing Sheets

(58) Field of Classification Search
USPC .......................................... 294/93, 195, 207
See application file for complete search history.

(56) References Cited

U.S. PATENT DOCUMENTS

| | | | |
|---|---|---|---|
| 4,518,187 A | 5/1985 | Blatt et al. | |
| 4,557,661 A | 12/1985 | Fischer et al. | |
| 4,975,020 A * | 12/1990 | Kaasa | B65G 47/90 |
| | | | 294/103.1 |
| 7,575,262 B2 * | 8/2009 | Alba | B66C 1/66 |
| | | | 294/89 |
| 7,950,709 B1 * | 5/2011 | Cheney | B66C 1/427 |
| | | | 294/103.1 |
| 2006/0233086 A1 | 10/2006 | Smolovich | |

FOREIGN PATENT DOCUMENTS

| | | |
|---|---|---|
| EP | 0241878 A1 | 10/1987 |
| EP | 1943064 B1 | 7/2009 |
| JP | S6039090 A | 2/1985 |
| JP | 2000343474 A | 12/2000 |
| JP | 2002307372 A | 10/2002 |
| JP | 2012024884 A | 2/2012 |

OTHER PUBLICATIONS

German Patent Office; Office Action in German Patent Application No. 10 2014 210 331.2 dated Feb. 12, 2015; 10 pages.

Chinese Patent Office; Office Action in related Chinese Patent Application No. 2015800293359 dated Mar. 27, 2018; 19 pages.

\* cited by examiner

GRIPPING JAW SAFETY DEVICE WITH TONGUE AND GROOVE FOR HRC

CROSS-REFERENCE

This application is a national phase application under 35 U.S.C. § 371 of International Patent Application No. PCT/EP2015/062132, filed Jun. 1, 2015 (pending), which claims the benefit of German Patent Application No. DE 10 2014 210 331.2 filed Jun. 2, 2014, the disclosures of which are incorporated by reference herein in their entirety.

TECHNICAL FIELD

The invention relates to a gripping device, which is provided, in particular, as an effector for an industrial robot and which is equipped with a mechanical safety device, as well as a robotic system comprising such a gripping device, and a method for gripping workpieces provided with hollow spaces.

BACKGROUND

Industrial robots are programmable machines that are designed for automatically handling or machining objects or, more specifically, workpieces. A typical representative is a so-called articulated robot that has a plurality of links, which are connected to each other by joints. In the simplest form such an industrial robot comprises a frame, on which a so-called carousel is arranged in a manner allowing rotation. A first arm of the robot, which is also referred to as a link arm, is fastened to the carousel by means of an additional pivot joint. An additional arm is disposed on this link arm by means of another pivot joint. This additional arm is provided on its free end with a receptacle for a tool. The tool is also referred to as an effector. Depending on the purpose of the industrial robot, a variety of tools may be provided, so that the industrial robot can have a multitude of applications, such as, for example, the handling and transport of objects and workpieces, the machining of workpieces, measurement tasks, etc. In order to handle objects or workpieces, a plurality of gripping tools for robots are already known from the prior art.

For example, the European Patent No. EP 1 943 064 B1 discloses a robot gripper, which is provided as an effector of a robot arm or may be attached to the end regions of linear or rotational drives. The prior art gripper comprises at least one frame and an actuator element that is mounted thereon and that has at least two gripper jaws or, more specifically, clamping jaws that can be actuated by means of an articulated unit. The actuator element is designed in the form of a bellows and can be filled with a medium, as a result of which said actuator element is capable of expanding and acts by means of a suitable force transmission element on the clamping jaws, in order to move them relative to each other, in order to be able to grasp objects. In this case the gripper itself has no safety devices that could prevent, for example, a person, who is working together with the corresponding robot, from being injured, in particular, crushed by the gripper. In the open state of the clamping jaws of the prior art gripper, it is namely possible for objects or also body parts of a person to be inadvertently inserted into the space between the two clamping jaws. If at this instant the actuator is actuated, then when the clamping jaws move, they may cause serious injury.

SUMMARY

Therefore, the object of the present invention is to provide an improved gripping device, in particular, for use with an industrial robot in such a way that said gripping device is safer to handle and that when the device is running, the risk of injuring a person is reduced. Another object of the present invention is to provide a robotic system that is improved in terms of safety as well as to provide a method for grasping objects having hollow spaces in a better and safer way.

The inventive gripping device is provided, in particular, as an effector for an industrial robot and comprises first and second clamping jaws, which are arranged so as to be moveable relative towards each other, in order to grasp a workpiece. During the relative movement towards each other of the two clamping jaws, a person may be seriously injured, for example, when a body part, such as, for example, the fingers of a worker, gets between the two clamping jaws. In order to prevent this danger, the invention provides that the first clamping jaw be provided with a tongue projection. The term tongue projection is understood herein to mean in its most general form a tongue in the sense of a tongue and groove connection. The tongue projection is arranged on that side of the clamping jaw that faces the second clamping jaw in the gripping device. Correspondingly this second jaw has on the side facing the first clamping jaw a corresponding groove, into which the tongue projection can dip. When the clamping jaws are in a state, in which said clamping jaws are moved completely towards each other, the tongue projection is at least partially accommodated in this groove, so that the two clamping jaws have a large range of motion despite the tongue projection. In the state, in which the clamping jaws are moved away from each other, the space between the two clamping jaws is at least partially occupied by the tongue projection, in order to prevent objects or body parts from being inadvertently inserted into the occupied space. As a result, it is no longer possible to guide unintentionally, i.e., inadvertently objects or body parts into the (now) occupied space.

The inventive safety of the gripping device is particularly advantageous in gripping devices of the type of a "spreading gripper" that is designed to grasp workpieces having hollow spaces by inserting the two clamping jaws into a hollow space of the workpiece. Then the two clamping jaws are moved away from each other until the two clamping jaws come into clamping contact with the inner walls of the hollow space. In such embodiments it is generally preferred that the first and second clamping jaws have in each case associated gripping surfaces that are arranged on those sides of the clamping jaws that face away from the respective other clamping jaw. In other words the gripping surfaces are preferably provided on that side of the clamping jaw that is opposite the side of the respective clamping jaw, where the tongue projection or the groove is provided.

In a preferred embodiment the first and second clamping jaws have in each case associated gripping surfaces for grasping workpieces; and these gripping surfaces are convexly rounded. Such a convex curvature is particularly advantageous in the case, which is described above in which the clamping jaws are inserted into the hollow space of a workpiece, since the convex curvature enables a self-centering of the clamping jaws or, more specifically, the gripping device in the hollow space of the workpiece, in particular, if the hollow space has round inner walls.

It is generally preferred that the gripping surfaces of the clamping jaws be equipped with means that prevent or act against the workpieces from slipping off the gripping surfaces. Therefore, it is particularly preferred that the gripping surfaces of the clamping jaws be at least partially equipped with an anti-slip material and, in particular, be rubberized.

In a preferred embodiment the gripping device comprises additionally a housing, in which the clamping jaws are guided. Furthermore, the housing is preferably provided with a suitable actuator, in particular, a hydraulically or pneumatically operated actuator, with which the two clamping jaws are moved. In addition, the housing is preferably provided with fastening means, with which the housing, including the actuator and the gripping device, can be fastened to the arm of an industrial robot.

Preferably the clamping jaws of the gripping device are designed more or less in the shape of a rod and extend parallel to each other, wherein the tongue projection and the associated groove extend along the longitudinal axis of the rod-shaped clamping jaws.

In most applications a correspondingly dimensioned tongue projection suffices, but it is also conceivable to provide within the scope of the invention two or more such tongue projections, which are arranged, for example, in a line, as long as the distances between the tongue projections are small enough to prevent body parts from being unintentionally inserted in-between. Thus, the wording used herein, that the clamping jaw comprises a tongue projection is to be construed in such a way that said clamping jaw has at least one tongue projection.

The above described rod-shaped design of the clamping jaws has the advantage that it makes it possible for the tongue projection and the associated groove to be able to extend over the entire length of the clamping jaws, i.e. to 100%, with said length lying outside the housing. However, for the purposes of the invention, that is, to make the gripping devices safer, it may already suffice, if the tongue projection and the associated groove extend over at least 80% of the length of the clamping jaws, preferably over at least 90%, more preferably over at least 95%, but, as mentioned, most preferably over 100% of the length.

The present invention also relates to a robotic system, such as, in particular, an industrial robot, such as, for example, an articulated robot, which comprises at least one robot arm. The robot arm is provided, according to the present invention, with a gripping device, so that a robotic system, which is improved in terms of safety, is provided; and this robotic system allows, in particular, a safer human-robot collaboration (HRC).

In addition, the invention relates to an improved method that is intended for grasping workpieces, which are provided with hollow spaces, and that enables the use of an inventive gripping device. The method is based on a robotic system, as described above, to grasp workpieces having hollow spaces. For this purpose in a first step the two clamping jaws of the gripping device are moved at least partially towards each other and then inserted by means of the robot arm into the hollow space of a workpiece that is to be moved. Then the two clamping jaws are moved apart again until the clamping jaws come into contact with the walls of the hollow space; and, in so doing, the workpiece is securely grasped. Then the grasped workpiece can be moved and, for example, guided by the robot to a desired location. At this location the two clamping jaws are moved towards each other again and moved out of the hollow space of the workpiece, after which the robot or, more specifically, the robotic system is ready to grasp another workpiece.

BRIEF DESCRIPTION OF THE DRAWINGS

Other advantageous embodiments of the invention are explained in conjunction with the figures reproduced below. In this context.

DETAILED DESCRIPTION

Figure 1:
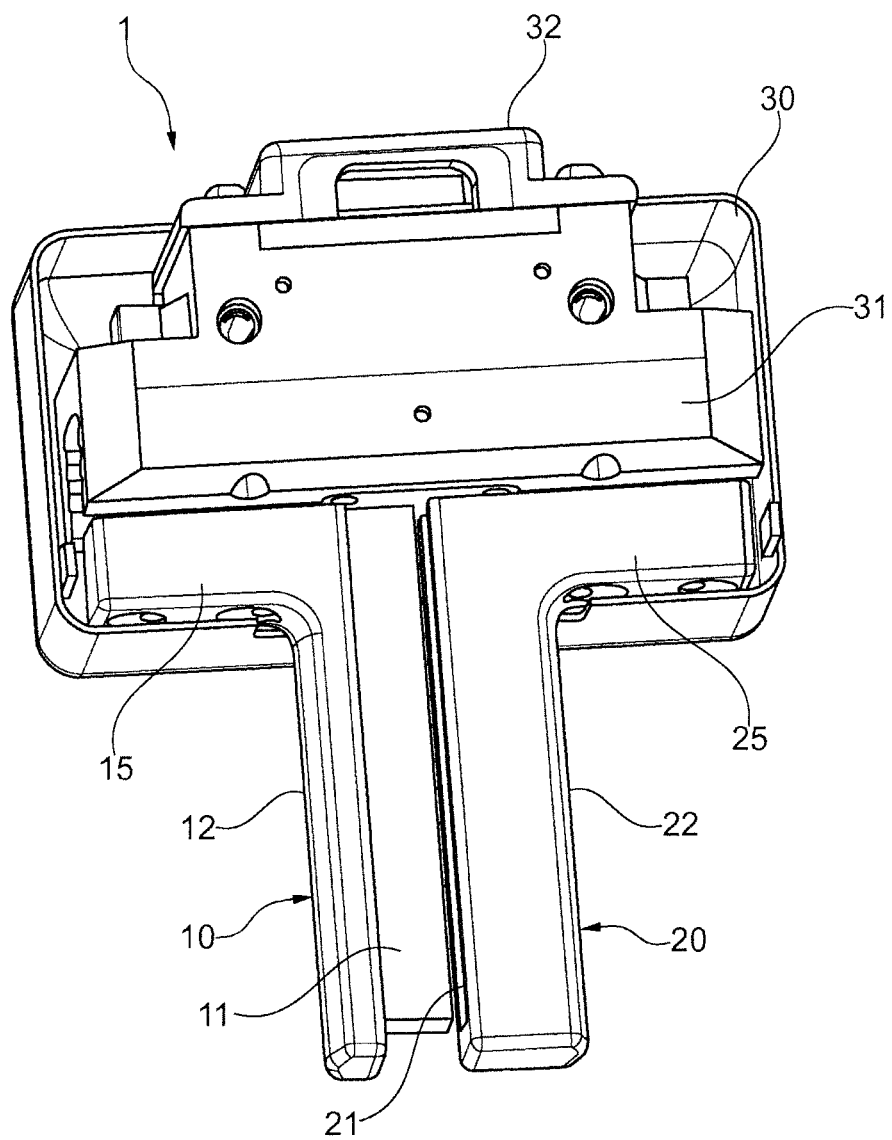
FIG. 1 shows a schematic three-dimensional view of an inventive gripping device with the housing partially open.

FIG. 1 shows an inventive gripping device 1 in a schematic three-dimensional view with the housing 30 partially open. The gripping device 1 has two clamping jaws 10 and 20, which are arranged so as to be moveable relative towards each other. As evident to the person skilled in the art, the gripping device 1, shown in the figures, is a spreading gripper that is designed to be inserted into the interior or hollow space of workpieces and to grasp these workpieces by moving apart or spreading the two clamping jaws 10 and 20. The two clamping jaws are designed in a rod shape and extend parallel to each other. The first clamping jaw 10 has a tongue projection 11 on the side that faces the second clamping jaw 20. The tongue projection 11 is formed integrally with the clamping jaw 10, but may also be a separate part that is disposed on or fastened to the first clamping jaw 10. The second clamping jaw 20 has a groove on the side facing the first clamping jaw; and this groove is designed to accommodate the tongue projection 11. In the arrangement shown in FIG. 1, the two clamping jaws are moved away from each other; that is, they are shown in a position, in which they are the furthest away from each other. It is evident that the in principle free space between the two clamping jaws, is almost totally occupied by the tongue projection 11. In the "open" position of the clamping jaws shown in FIG. 1, this arrangement stops the objects or body parts from being inadvertently inserted into the occupied space. At the same time FIG. 1 shows that in this completely opened state there is still a gap between the groove 21 and the tongue projection 11. In a preferred embodiment this gap can also be closed in the completely opened state, so that in the totally opened state the tongue projection 11 already engages in the groove 21 or is partially accommodated by the groove 21.

The depth extension of the tongue projection 11 is also less than the depth extension of the clamping jaw 10, so that there is, nevertheless, a small possibility that an engagement/crushing between a resulting shoulder and the opposite inner face of the clamping jaw 20 can occur. In this case it is preferred that the depth extension of the tongue projection 11 be adapted as close as possible to the depth extension of the clamping jaw 10, so that the shoulder is as small as possible.

The first clamping jaw 10 has a gripping surface 12, in particular, on the side of the clamping jaw 10 that points away, i.e., faces away from the other clamping jaw 20. Analogously the second clamping jaw 20 has a gripping surface 22 on the side that faces away from the first clamping jaw. Both gripping surfaces are convexly rounded. After insertion of the two clamping jaws 10 and 20 into, for example, the hollow space of an object to be moved, the two clamping jaws are moved towards each other, as shown in FIG. 3. After insertion of the clamping jaws into the hollow space, the two clamping jaws are moved away from each other again until they have reached the position shown in FIGS. 1 and 2. In this position the gripping surfaces 12 and 22 are in contact with the inner walls of the hollow space of the workpiece, so that the workpiece is clamped with the clamping jaws and is grasped with the gripping device. In the event, however, that the opening should be smaller than the maximum diameter that can be grasped by the gripping jaws being fully opened, such openings may also be grasped like this, with the result that, in so doing, correspondingly not a complete, but a synchronized and/or adapted opening of the gripping jaws is effected or, more specifically, can be carried out. The convex curvatures of the gripping surfaces 12 and 22 allow a self-centering of the clamping jaws in the hollow space of the workpiece and enable an extremely secure grip of the workpiece. While the inventive safety of the gripping device is particularly effective due to a corresponding tongue projection in the type of spreading gripper that is shown, it goes without saying that the invention is not limited to the spreading gripper, but rather can also be used effectively in other types of grippers. For example, the gripping device, shown in the figures, can also grasp objects by moving the two clamping jaws towards one another, i.e., by clamping the objects with the tip of the rod-shaped clamping jaws 10 and 20. For this reason the tongue projection 11 in the illustrated embodiment does not extend over the entire length of the rod-shaped clamping jaws, but rather only to about 95%, and terminates just before the tip or rather the free end of the clamping jaw 10. The remaining free space between the two clamping jaws 10 and 20, which is not occupied by the tongue projection 11, is in practice too small for a body part to be inserted therein and, as a result, to be clamped, but it is sufficiently large to grasp (small) workpieces that are shaped accordingly.

In addition, the housing 30 of the gripping device 1 is provided with an actuator 31, with which the two clamping jaws can be actuated or, more specifically, moved. For example, the actuator may be an electric motor, but it works primarily with a hydraulic or pneumatic energy source. Furthermore, the top of the housing 30 is provided with fastening means 32 for fastening the gripping device 1 to a robot arm 40.

The two rod-shaped clamping jaws 10, 20 have a foot 15 or 25 respectively on their housing-sided end. With this foot the clamping jaws are guided in or on the housing. In the embodiment that is shown, the feet are connected to the housing-sided end of the rod-shaped clamping jaws and project at a right angle from the rod-shaped clamping jaws. They can be integrally formed, as shown, with the clamping jaws, or they may be separate elements that are fastened to the housing-sided ends of the clamping jaws, for example, by means of a screw connection. If desired, the convexly rounded gripping surfaces 12 and 22 may also be equipped with an anti-slip material and, in particular, may be rubberized.

As shown in FIG. 1, the two clamping jaws are designed in a rod shape and extend parallel to each other, where in this case the tongue projection 11 and the associated groove 21 extend along the longitudinal axis of the clamping jaws. In the embodiment that is shown, exactly one tongue projection 11 and exactly one groove 21 are provided, but the present invention is not limited to such embodiments, but rather it is also possible to provide, for example, two or more tongue projections 11. In particular, it is conceivable that the tongue projection 11 is formed by two or more tongue projections that are located in a line, so that there are gaps between the individual tongue projections. This design may have advantages in terms of production without decreasing the safety function of the tongue projection, provided that the individual gaps between the projections are not too large. In the exemplary embodiment that is shown, the tongue projection 11 extends over approximately 95% of the length of the rod-shaped clamping jaws, with said length lying outside the housing, so that the tip of the two rod-shaped clamping jaws 10 and 20, i.e., the free end of the clamping jaws, may be provided with additional gripping surfaces that can grasp an object when the two clamping jaws are moved towards each other. However, the structure is particularly safe, when the tongue projection and the associated groove extend over the entire length of the rod-shaped clamping jaw, i.e., to 100%, with said length lying outside of the housing. In the exemplary embodiment that is shown, the tongue projection 11 and the groove 21 also extend into the parts of the clamping jaws 10, 11 that are disposed inside the housing 30. This arrangement has production related reasons and is not required for the safety of the design, since the part of the clamping jaws that is located in the housing is secured by the housing itself, as can be seen in FIGS. 2 and 3.

Figure 2:
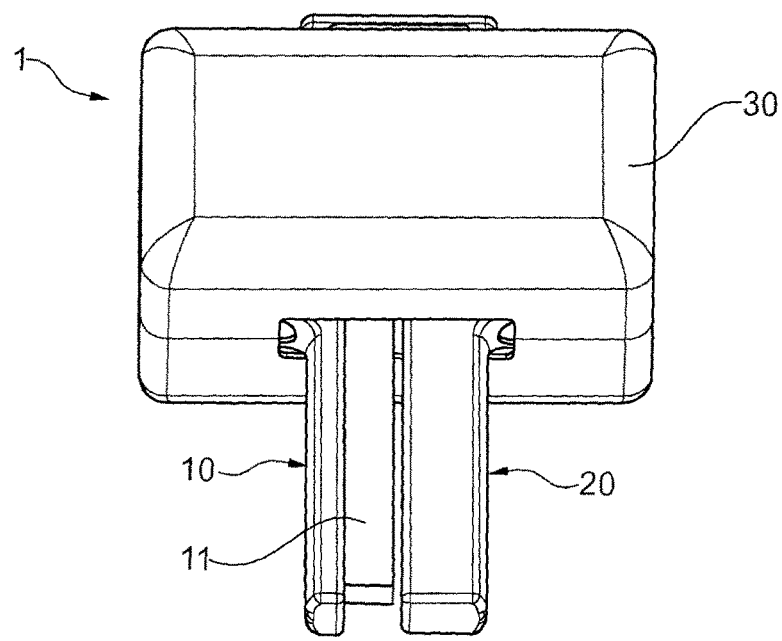
FIG. 2 shows the gripping device from FIG. 1 with the housing closed.
Figure 3:
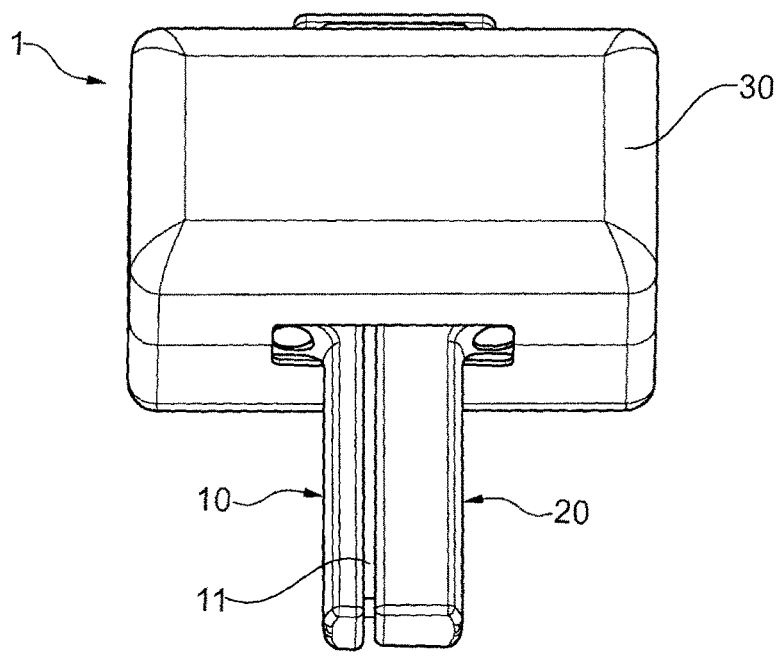
FIG. 3 shows the view from FIG. 2 when the two clamping jaws are moved towards each other.
Figure 4:
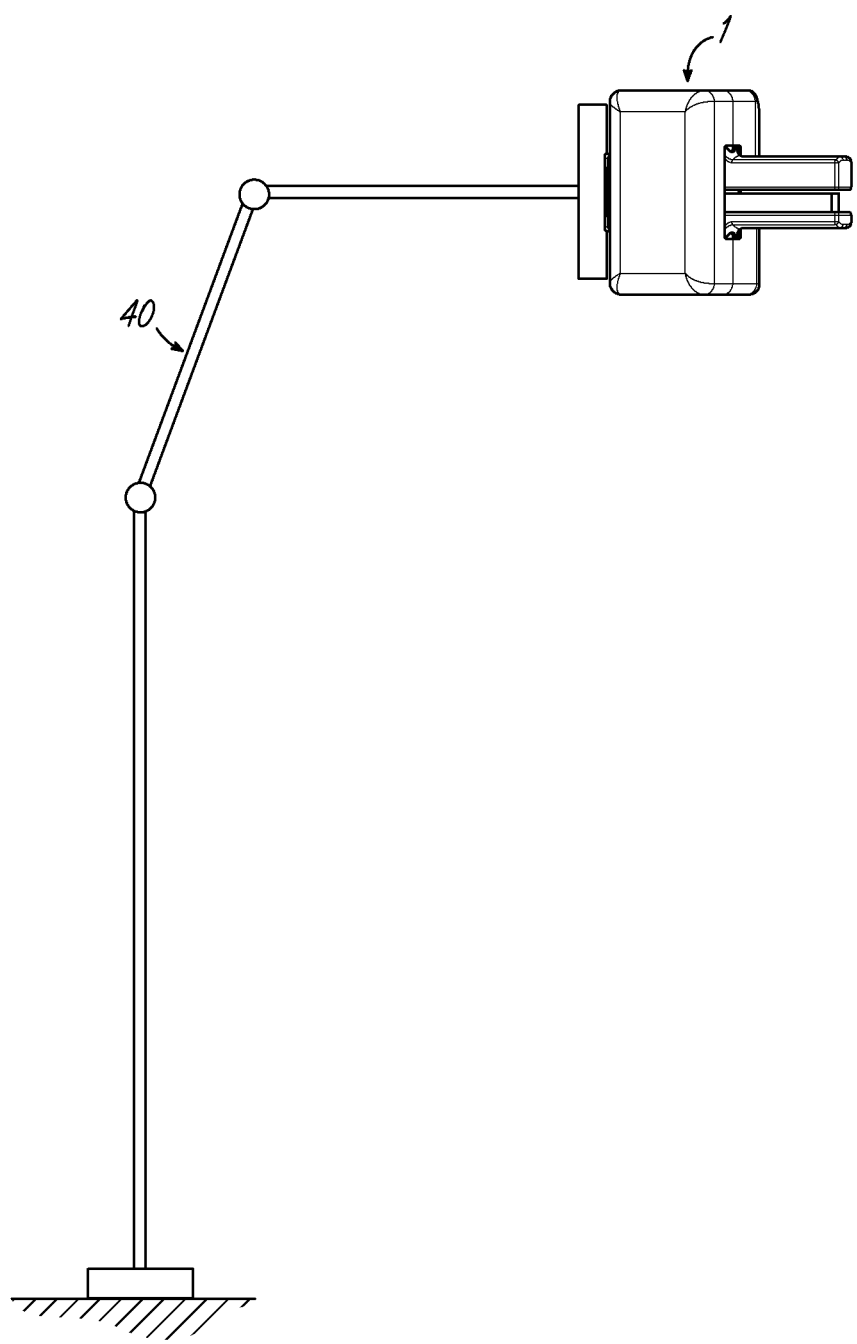
FIG. 4 is a schematic depiction of a robot arm with an exemplary gripping device.

FIG. 2 shows the gripping device 1 with the housing 30 closed in a schematic three-dimensional view. The two clamping jaws 10 and 20 are moved away from each other, i.e., shown in their fully spread apart position. The tongue projection 11 occupies almost completely the space between the two clamping jaws, so that an unintentional insertion of objects and, in particular, body parts into the occupied space is effectively prevented. The oblong remaining gap between the tongue projection 11 and the second clamping jaw 20, which can be seen in FIG. 2, is too small for a body part to be inserted into said space.

In FIG. 3 the gripping device from FIG. 2 is shown again, but this time the two clamping jaws 10 and 20 are completely moved towards each other. The tongue projection 11 is guided into the corresponding groove 21. The relative movement of the two clamping jaws from the position in FIG. 2 to the position in FIG. 3 would constitute a hazard without the tongue projection 11, especially if the gripping device is provided on a robot that works autonomously, since the gripping devices themselves are not usually equipped with appropriate sensors, with which it could be detected, whether an object or a body part has been unintentionally inserted into the free space between the two clamping jaws 10 and 20. As a result, the inventive tongue projection 11 of the gripping device 1 allows the construction of better robotic systems in terms of safety.

It can be seen in FIG. 3 that the tongue projection 11 is not completely guided into the groove 21, but also possible is a configuration, in which in the fully closed state of the clamping jaws 10 and 20 the tongue projection 11 is totally disposed in the groove 21 or, more specifically, is guided into said groove.

Furthermore, it can be seen in all of the FIGS. 1 to 3 that at least one, but preferably all of the resulting edge(s) of the clamping jaws 10 and 20 is/are designed in such a way that it/they is/are rounded off and/or beveled, so that no sharp and/or pointed edges are produced or are present, at which an injury of a worker could take place. Preferably the tongue projection 11 and/or the groove 21 has/have more or less rounded off and/or beveled edges.

While the present invention has been illustrated by a description of various embodiments, and while these embodiments have been described in considerable detail, it is not intended to restrict or in any way limit the scope of the appended claims to such detail. The various features shown and described herein may be used alone or in any combination. Additional advantages and modifications will readily appear to those skilled in the art. The invention in its broader aspects is therefore not limited to the specific details, representative apparatus and method, and illustrative example shown and described. Accordingly, departures may be made from such details without departing from the spirit and scope of the general inventive concept.

LIST OF REFERENCE NUMERALS 1 gripping device
10 first clamping jaw
11 tongue projection
12 gripping surface
15 foot
20 second clamping jaw
21 groove
22 gripping surface
25 foot
30 housing
31 actuator
32 fastening means
40 Robot Arm

What is claimed is:

1. A gripping device for an industrial robot, the gripping device comprising:
    first and second clamping jaws having respective first and second gripping surfaces and configured for relative movement towards and away from each other to facilitate grasping a workpiece with the gripping surfaces;
    the first clamping jaw including an elongate tongue projection on a side that faces the second clamping jaw and is disposed opposite the first gripping surface;
    the second clamping jaw including an elongate groove on a side facing the first clamping jaw and disposed opposite the second gripping surface, the groove corresponding to the tongue projection and at least partially accommodating the tongue projection in a state wherein the first and second clamping jaws are moved toward each other;
    the tongue projection and groove each extending longitudinally in a direction corresponding to a longitudinal extent of the respective first and second jaws; and
    in a state wherein the first and second clamping jaws are moved away from each other, the space between the first and second clamping jaws is at least partially occupied by the tongue projection such that inadvertent insertion of objects or body parts into the occupied space is prevented.

2. The gripping device of claim 1, wherein the gripping device is an end effector of an industrial robot.

3. The gripping device of claim 1, wherein the first and second clamping jaws each comprise associated gripping surfaces;
    each gripping surface disposed on a side of the respective clamping jaw that faces away from the other clamping jaw, such that the gripping device facilitates grasping workpieces having hollow spaces by moving the first and second clamping jaws apart in a hollow space to engage the workpiece with the gripping surfaces.

4. The gripping device of claim 1, wherein the first and second clamping jaws each comprise associated gripping surfaces, and wherein the gripping surfaces are convexly rounded.

5. The gripping device of claim 1, wherein the first and second clamping jaws each comprise associated gripping surfaces, and wherein the gripping surfaces are provided with an anti-slip material.

6. The gripping device of claim 5, wherein the anti-slip material comprises a rubberized material.

7. The gripping device of claim 1, further comprising a housing, wherein the first and second clamping jaws are guided in the housing.

8. The gripping device of claim 7, wherein the housing includes an actuator.

9. The gripping device of claim 8, wherein the actuator is one of a hydraulically, electrically, or pneumatically operated actuator.

10. The gripping device of claim 7, wherein:
    the first and second clamping jaws are rod-shaped and extend parallel to each other; and
    wherein the tongue projection and the corresponding groove extend along respective longitudinal axes of the first and second clamping jaws.

11. The gripping device of claim 10, wherein the tongue projection and the corresponding groove extend over at least 80 percent of the length of the first and second clamping jaws, with the length of the tongue projection and the corresponding groove lying outside of the housing.

12. The gripping device of claim 11, wherein the first and second clamping jaws each comprise a foot on an end adjacent the housing, each foot projecting at a right angle from the from the respective clamping jaw and guided in the housing.

13. The gripping device of claim 10, wherein the tongue projection and the corresponding groove extend over at least 90 percent of the length of the first and second clamping jaws, with the length of the tongue projection and the corresponding groove lying outside of the housing.

14. The gripping device of claim 10, wherein the tongue projection and the corresponding groove extend over at least 95 percent of the length of the first and second clamping jaws, with the length of the tongue projection and the corresponding groove lying outside of the housing.

15. The gripping device of claim 10, wherein the tongue projection and the corresponding groove extend over the entire length of the first and second clamping jaws, with the length of the tongue projection and the corresponding groove lying outside of the housing.

16. The gripping device of claim 1, wherein the tongue is withdrawn from the groove in the state wherein the first and second clamping jaws are moved away from each other.

17. A robotic system, comprising:
    a robot arm; and
    a gripping device supported on the robot arm, the gripping device comprising:
        first and second clamping jaws having respective first and second gripping surfaces and configured for relative movement towards and away from each other to facilitate grasping a workpiece with the gripping surfaces,
        the first clamping jaw including an elongate tongue projection on a side that faces the second clamping jaw and is disposed opposite the first gripping surface,
        the second clamping jaw including an elongate groove on a side facing the first clamping jaw and disposed opposite the second gripping surface, the groove corresponding to the tongue projection and at least partially accommodating the tongue projection in a state wherein the first and second clamping jaws are moved toward each other,
        the tongue projection and groove each extending longitudinally in a direction corresponding to a longitudinal extent of the respective first and second jaws, and in a state wherein the first and second clamping jaws are moved away from each other, the space between the first and second clamping jaws is at least partially occupied by the tongue projection such that inadvertent insertion of objects or body parts into the occupied space is prevented.

18. A method for grasping workpieces having hollow spaces, the method comprising:
  obtaining a robotic system in accordance with claim 17;
  moving the first and second clamping jaws at least partially towards each other;
  inserting the first and second clamping jaws, which have been moved towards each other, into a hollow space of a workpiece;
  moving the first and second clamping jaws apart from each other until the first and second clamping jaws come into contact with inner surfaces of the hollow space and, in so doing, the workpiece is grasped;
  moving the grasped workpiece.

19. The robotic system of claim 17, wherein the tongue of the gripping device is withdrawn from the groove in the state wherein the first and second clamping jaws are moved away from each other.

\* \* \* \* \*